(12) United States Patent
Sinoplu et al.

(10) Patent No.: US 9,004,541 B2
(45) Date of Patent: Apr. 14, 2015

(54) TWO-PART COMPOSITE FITTING

(75) Inventors: Sudi Sinoplu, Attendorn (DE); Andreas Schneider, Finnentrop (DE)

(73) Assignee: Viega GmbH & Co. KG, Attendorn (DE)

( * ) Notice: Subject to any disclaimer, the term of this patent is extended or adjusted under 35 U.S.C. 154(b) by 230 days.

(21) Appl. No.: 13/063,880

(22) PCT Filed: Sep. 15, 2009

(86) PCT No.: PCT/EP2009/061933
§ 371 (c)(1),
(2), (4) Date: Mar. 31, 2011

(87) PCT Pub. No.: WO2010/031750
PCT Pub. Date: Mar. 25, 2010

(65) Prior Publication Data
US 2011/0169262 A1   Jul. 14, 2011

(30) Foreign Application Priority Data

Sep. 16, 2008   (DE) .......................... 10 2008 047 544

(51) Int. Cl.
*F16L 33/213* (2006.01)
*F16L 13/14* (2006.01)
*F16L 33/22* (2006.01)
*F16L 37/138* (2006.01)

(52) U.S. Cl.
CPC ............. *F16L 13/146* (2013.01); *F16L 13/141* (2013.01); *F16L 33/225* (2013.01); *F16L 37/138* (2013.01); *Y10S 285/905* (2013.01)

(58) Field of Classification Search
USPC ......... 285/239, 241–242, 248, 423, 238, 255, 285/259, 905, 258
See application file for complete search history.

(56) References Cited

U.S. PATENT DOCUMENTS

| | | | | |
|---|---|---|---|---|
| 191,716 | A * | 6/1877 | Caldwell | 92/161 |
| 2,278,239 | A * | 3/1942 | Butler | 285/222.4 |
| 2,733,940 | A * | 2/1956 | Millar | 285/222.4 |
| 2,733,941 | A * | 2/1956 | Trevaskis | 285/222.1 |
| 3,003,792 | A * | 10/1961 | Gilmour | 285/81 |
| 3,381,981 | A * | 5/1968 | Wilson | 285/222.4 |
| 3,423,109 | A * | 1/1969 | New et al. | 285/222.1 |
| 3,533,649 | A | 10/1970 | Williams | |
| 3,537,729 | A * | 11/1970 | Burkett | |
| 3,612,584 | A | 10/1971 | Taylor | |
| 4,033,614 | A | 7/1977 | Hanson | |
| 4,412,693 | A | 11/1983 | Campanini | |
| 4,626,001 | A * | 12/1986 | Lee | 285/905 |
| 5,037,142 | A * | 8/1991 | Helping | |
| 5,326,137 | A * | 7/1994 | Lorenz et al. | 285/258 X |
| 5,590,914 | A * | 1/1997 | Platner et al. | 285/258 X |
| 6,311,733 | B1 * | 11/2001 | Azzolini et al. | 285/259 X |
| 2005/0067833 | A1 | 3/2005 | Ball | |

FOREIGN PATENT DOCUMENTS

CN        85104774 A     12/1986
CN        2743660 Y      11/2005
(Continued)

*Primary Examiner* — Gregory Binda
(74) *Attorney, Agent, or Firm* — The Webb Law Firm

(57) ABSTRACT

A fitting for sealingly connecting to a pipe end of a pipe comprising a plastic material, comprising a base member and a support member, wherein the base member is made of a metal, and the support member is designed as a separate part made of plastic. The base member comprises means on the inside thereof, and the support member comprises means on the outside thereof for connecting the base member and the support member in a sealing fashion. A system comprising such a fitting with a composite or multi-layered pipe and a sleeve, or such a fitting with a plastic pipe and a sleeve.

2 Claims, 10 Drawing Sheets

(56) References Cited

FOREIGN PATENT DOCUMENTS

| | | |
|---|---|---|
| CN | 2839784 Y | 11/2006 |
| DE | 4430114 A1 | 2/1996 |
| DE | 10035791 A1 | 3/2001 |
| EP | 0728979 A1 | 8/1996 |
| EP | 1293715 A2 | 3/2003 |
| WO | 9801695 A1 | 1/1998 |
| WO | 9851956 A1 | 11/1998 |

\* cited by examiner

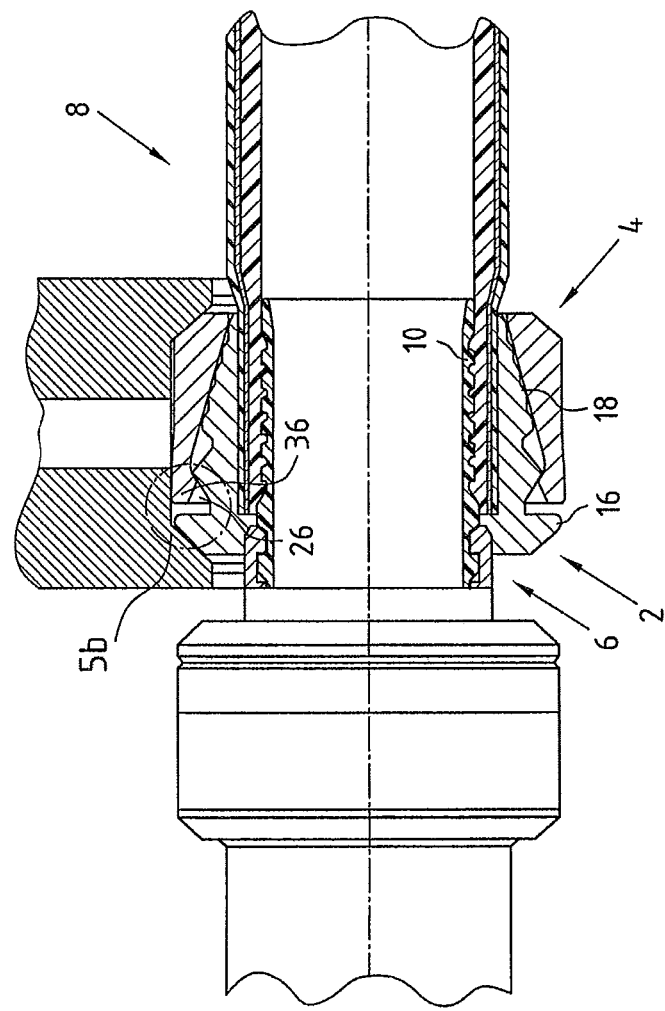

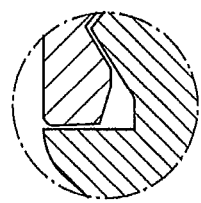
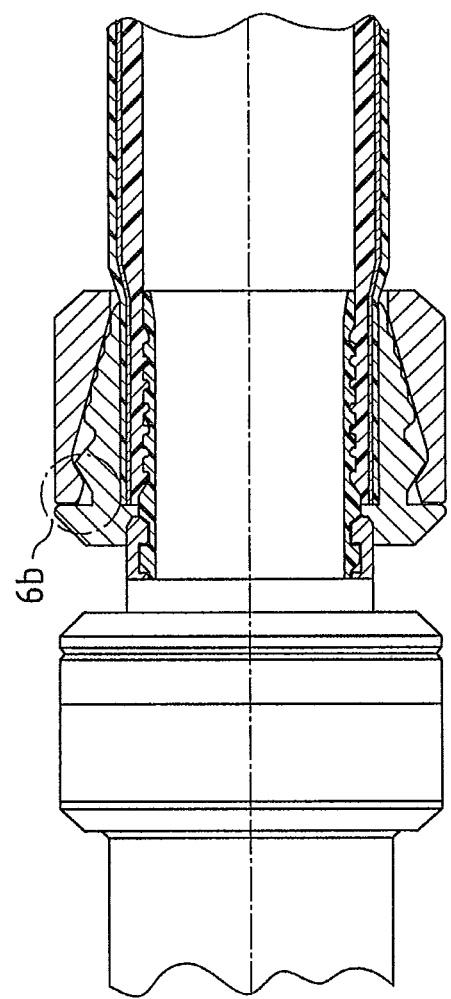
Fig. 6b
Fig. 6a

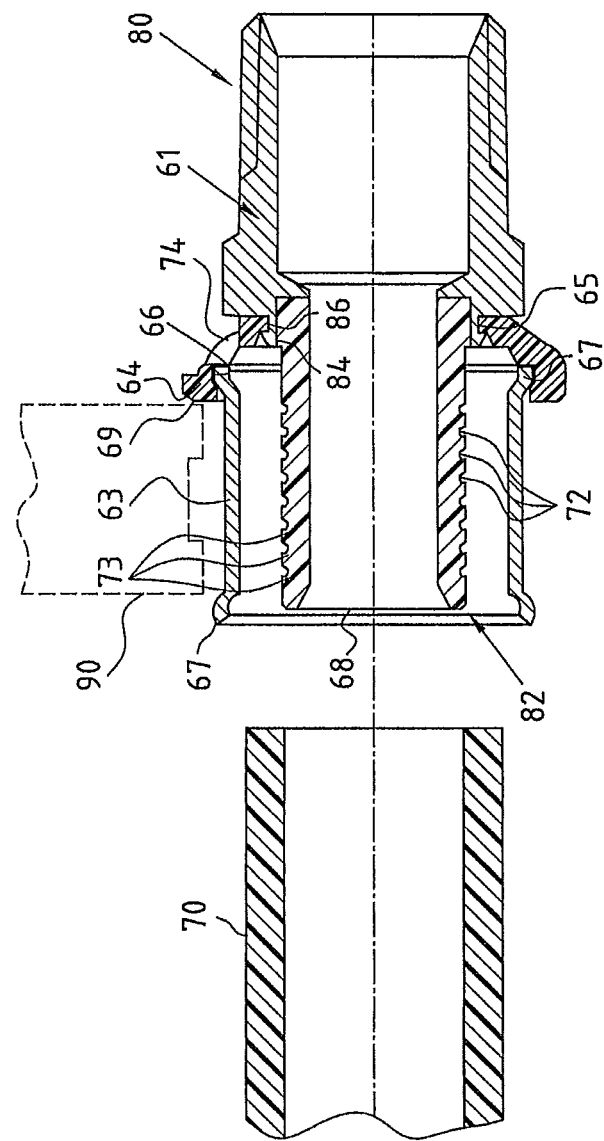

TWO-PART COMPOSITE FITTING

BACKGROUND OF THE INVENTION

1. Field of the Invention

The invention relates to a fitting for connecting in a sealing manner to an end of a pipe comprising a plastic material, having a base body and having a support body, wherein the base body consists of a metal. The invention also relates to a system having such a fitting, having a composite or multilayer pipe and having a sleeve, and to a system having such a fitting, having a plastic pipe and having a sleeve. The invention, furthermore, also relates to the use of such a fitting for connecting to a composite or multilayer pipe and to the use of such a fitting for connecting to a plastic pipe.

2. Description of Related Art

A fitting for connecting to a pipe in a sealing manner is known from the prior art of EP 0 728 979 A1. The fitting (or the connecting piece) completely consists of a metal and has a support body (or a cylindrical section), onto which the pipe is fitted. A press ring is connected externally to the fitting and the pipe, which press ring is pressed with a pressing tool to secure the connection to the fitting and the pipe.

This pipe connection has the disadvantage that leakages can occur with the connection to a composite or multilayer pipe. Leaks can thus develop between the support body consisting of metal and the composite or multilayer pipe owing to different degrees of expansion when there are changes in temperature, which make the entire pipe connection leaky. In order to prevent this, an additional sealing element can be used, for example an O-ring. However, this leads to higher production costs and to difficulties when inserting the pipe to be connected into the pipe connection.

Since composite or multilayer pipes are, for example, often used in sanitary engineering, particularly for piping systems for underfloor heating and concealed pipe systems, it is desirable for the connections with these pipes to have a high reliability and a long durability. In order to deal with the problems of conventional connections to composite or multilayer pipes, various approaches are followed in the prior art. Thus, fittings are known where the support bodies 15 of these fittings have been overmolded with plastic. This has the disadvantage that the production of such fittings, owing to the additional overmolding process, is often elaborate and expensive. Furthermore, the connection between the metal of the fitting and the overmolded plastic layer often does not retain its reliability.

Another alternative from the prior art is the use of fittings manufactured completely from plastic. However, these fittings, compared to fittings manufactured from metal, have the disadvantage that they have a sharp-edged inner profile. Thus, it is advantageous, for example with T-piece fittings made of metal, for the inner profile of the fitting to be designed rounded with a certain radius at the tee edge, in order to reduce the pressure loss of the conveyed medium. With fittings manufactured completely from plastic this is not possible or is only possible with elaborate and cost-intensive post-processing.

SUMMARY OF THE INVENTION

The present invention is based on the technical problem of providing a fitting which ensures a reliable leak-tightness with the connection to a composite or multilayer pipe, avoiding the abovementioned disadvantages.

Due to the fact that the support body is formed as a part which is separate from the base body and is made of a plastic material and that the base body on the inside thereof and the support body on the outside thereof have means which connect the base body and the support body in a sealing manner, a fitting is provided which combines the stability and durability of a metal fitting and the leak-tightness between the support body and a connected multilayer or composite pipe of a plastic fitting.

The invention as a result overcomes, amongst other things, the technical preconception that a plastic component cannot be connected in a sealing manner without further auxiliary means, like for example further sealing means, in particular an O-ring.

It has become apparent that the connection of a support body made of plastic to a composite or multilayer pipe has a substantially more reliable leak-tightness and greater durability than the connection of a support body made of metal to such a pipe. A metal usually exhibits substantially lower thermal expansion than a plastic material. Thus, for example for room temperature, the coefficient of thermal expansion $\alpha$ is $16.5 \cdot 10^{-6}\,K^{-1}$ for the metal copper and $70 \cdot 10^{-6}\,K^{-1}$ for the plastic material polystyrene. It has also become apparent that a base body made of metal has a substantially greater stability and durability than a base body made of plastic. In the invention, it has thus been identified that the advantages of a support body made of a plastic material can be beneficially combined with the advantages of a base body made of metal in the described way. The different degrees of thermal expansion of the metal and the plastic material are furthermore exploited in the described invention to produce a reliable and leak-proof connection between support body and base body. Thus, according to the arrangement of the means according to the invention for connecting support body and base body, the arrangement of the support body is provided in the area of the connection in the base body. The leak-tightness of the connection is, in this way, also ensured by the stronger expansion of the inner lying plastic material with an increase in temperature.

An advantageous embodiment of the fitting is provided by the material of the support body having a greater coefficient of thermal expansion than the material of the base body.

Since an increase in temperature is often associated with an increase in pressure of the medium conveyed in the pipe, it is often advantageous if the connection between the base body and the support body is a force-fit one and the force causing the force-fit connection increases with increased temperature, so that the leak-tightness of this connection is also ensured with increased pressure. The greater thermal expansion of the support body, which is located in the area of the connection in the base body, leads precisely to such a strengthening of the force-fit connection. The support body is thereby designed in such a way that even with the lowest possible operating temperature the leak-tightness of the connection between base body and support body is ensured.

A further advantageous embodiment of the fitting is provided by the support body consisting of a plastic material with little creep.

Deformation of the support body can occur owing to temperature changes or application of pressure to the support body when pressing the fitting together with a pipe. To ensure the leak-tightness of the connections between the pipe and the support body and between the support body and the base body, the support body can advantageously consist of a plastic material with little creep. It is thereby ensured that the plastic material of the support body deformed by pressure does not permanently remain in the deformed state but when pressure is released occupies its original shape again. The stability of the shape of the support body in the process results in the connection being very durable.

A further advantageous embodiment of the fitting is provided by the support body consisting of polyphenylsulfone (PPSU), polyvinylidene fluoride (PVDF) or of another plastic material approved for drinking water.

The use of such a plastic material has the advantage that the fitting can be used in connection with piping through which drinking water is conveyed. For use of the fitting in a heating or cooling pipe system, the support body of the fitting advantageously consists of a temperature and hydrolysis resistant plastic material.

A further advantageous embodiment of the fitting is provided by latching, screwing or gluing the support body to the base body.

In order to ensure the leak-tightness of the whole fitting, a durable leak-proof connection between base body and support body is required. By latching, screwing or gluing the support body to the base body, a particularly durable and secure connection between these two parts is provided. Furthermore, with a screw or latching connection the fitting can also be produced just directly before assembly from in each case an initially separate base body and a support body. This especially offers packaging processing advantages. An additional synergy effect is obtained when a support body consisting of an elastic plastic material is used together with a screw or a latching connection, since the elastic plastic material can be adapted to the shape of the latching element or the shape of the thread and in this way a particularly intimate form-fit connection results. With an adhesive connection, a particularly reliable firmly bonded connection is obtained between support body and base body. A further advantage of a latched, screwed or glued connection is that assembling the fitting as a connector can be carried out simply and reliably, since the two-part fitting according to the invention, owing to the connection of the two parts, can be handled as easily as a one-part fitting.

A further advantageous embodiment of the fitting is provided by the support body being connected oversized to the base body.

By connecting an oversized support body to the base body, a force arises on the inside of the base body in the area of the connection to the support body owing to the plastic material of the base body attempting to expand to its original size. A strong force-fit connection is achieved by means of this essentially radially outwardly acting force. This connection is particularly advantageous with temperature decreases, since the tendency of the support body to occupy its originally larger shape works against the contraction of the support body caused by the decrease in temperature. The leak-tightness of the connection is ensured in particular in the case of sudden temperatures changes and hence often occurring, irregularly rapid expansions and contractions of the support body and the base body.

A further advantageous embodiment of the fitting is provided by the support body consisting of an elastic plastic material.

By using an elastic plastic material for the support body, the plastic material of the support body can be adapted to the inner area of the base body in the area of the connection of support body and base body. In addition to the force-fit connection, this leads to an intimate form-fit connection between support body and base body and therefore to a further strengthening and increased reliability of this connection. Furthermore, an elastic plastic material makes it easier for the oversized support body to be inserted into the base body.

A further advantageous embodiment of the fitting is provided by the support body being formed from a plastic material, from which the pipe to be connected is also at least partly formed.

By using plastic material for the support body, from which the pipe to be connected to the support body is also partly formed, the thermal expansion between the support body and the pipe to be connected is balanced. The support body and the pipe thereby essentially expand to the same extent in the case of changes in temperature, so that the connection between the support body and the pipe essentially experiences no changes through the temperature change. On the one hand, leakages due to leak formation are prevented in this way and, on the other hand, material stresses in the support body or in the pipe, which could lead to quicker material fatigue and hence in the medium or long term to a leakage, are reduced or even eliminated. With a comparable thermal expansion of the pipe and the support body, the connection between support body and pipe can furthermore remain leak-proof even with a decrease in temperature.

Due to the fact that the fitting is connected to the composite pipe or the multilayer pipe and the sleeve is pressed together with the fitting and the composite pipe or the multilayer pipe, the reliability and durability of the fitting according to the invention is combined with the stability of a pressed connection. Pressing the sleeve together with the fitting and the composite or multilayer pipe thereby ensures that the pipe is securely held on the support body and, in addition, leads to a strong force-fit connection between the support body and the composite or multilayer pipe. This system is particularly advantageous when using a support body made of an elastic plastic material, since the plastic material of the support body due to the pressing pressure adapts itself to the shape of the base body in the connection area and thus forms an intimate form-fit connection between the support body and the composite or multilayer pipe.

It has become apparent that by fusing a plastic pipe to a support body made of plastic, a particularly reliable connection can be obtained between the support body and the plastic pipe. In contrast to systems having a fitting which is completely produced from a metal, the system with the fitting according to the invention enables such fusing to take place, since the support body consists of a plastic material. The sleeve in the process is used for additional fixing of the fitting to the pipe.

An advantageous embodiment of the use of the fitting is provided by the plastic pipe being at least partly firmly bonded to the support body. These uses according to the invention thereby also have the abovementioned advantages.

BRIEF DESCRIPTION OF THE DRAWINGS

FIGS. 5a-b show the fitting according to the present invention, the pipe, as well as the exemplary embodiments of the force-transmitting element and the sleeve in a cross-sectional view, before, after carrying out axial pressing, a radially inward pressing operation is performed, FIGS. 6a-b show the fitting according to the present invention, the pipe, as well as the exemplary embodiments of the force-transmitting element and the sleeve in a cross-sectional view, after the radially inward pressing operation has ended, FIG. 7 shows a second exemplary embodiment of a two-part fitting according to the invention in cross-section with a fitted sleeve, as well as a separate composite pipe.

DETAILED DESCRIPTION OF THE INVENTION

Below, with reference to FIGS. 1a to 6b, by way of example a system for producing a non-detachable workpiece connection according to the present invention is explained, in which an exemplary embodiment of a force-transmitting element 2 and a sleeve 4 find a use.

Figure 1A:
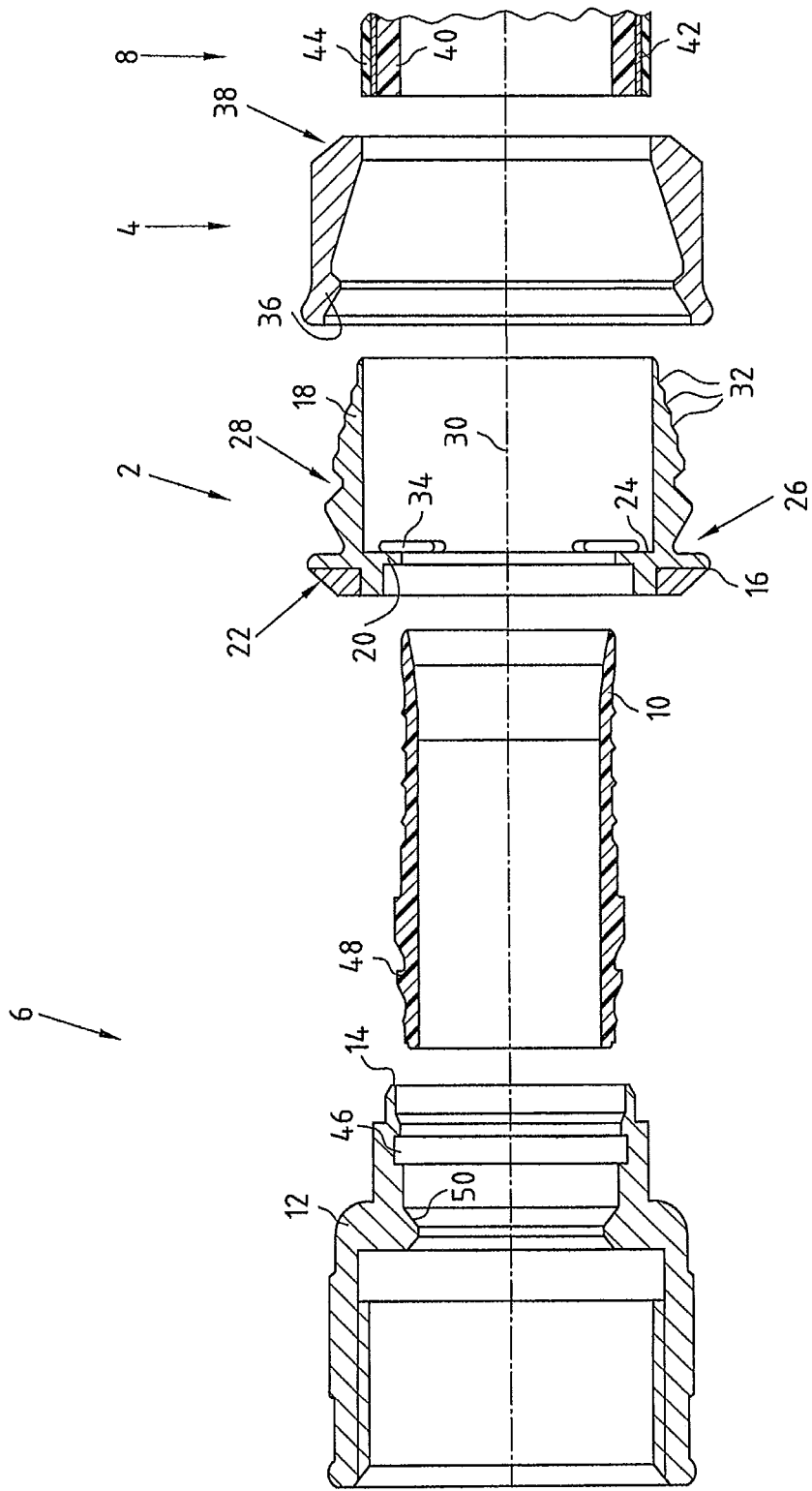
FIG. 1a shows a first exemplary embodiment of a two-part fitting according to the present invention, a pipe, as well as exemplary embodiments of a force-transmitting element and a sleeve in a cross-sectional view.

FIG. 1a shows four fittings in a cross-sectional view: a fitting 6, a force-transmitting element 2, a sleeve 4 and a pipe 8.

The fitting 6 has a support body 10, which has a profile and is made of a plastic material, for example PPSU, and a base body 12 made of a metal. The support body 10 and the base body 12 are still separate from one another in FIG. 1a. The fitting 6 has on the base body 12 an abutting face 14 turned in the axial direction. The profile of the support body 10 consists, in this particular example, of five annularly circumferential grooves which are delimited from one another by four annularly circumferential separating strips arranged between them. The inner peripheral surface of the support body 10 is essentially cylindrical, wherein, however, the support body wall at the end of the support body 10 remote from the base body 12, is slightly chamfered radially outwardly, in order to form the cross-section transition steadily.

A force-transmitting element 2 is arranged upstream from the fitting 6 in FIG. 1a. The force-transmitting element 2 has, in this particular example, a flange section 16 facing the fitting 6 and a transmitting section 18. On the inner peripheral surface, the flange section 16 has, in this exemplary embodiment, a contact element 20 extending radially inwardly. In the exemplary embodiment of the force-transmitting element 2 shown in FIG. 1a, on the outer peripheral surface of the flange section 16 on the face side, a chamfer 22 is, in addition, arranged which can serve as an interaction area with a pressing tool (not shown). The flange section 16 further has on its area extending radially inwardly an abutting face 24, turned in the axial direction, on which the front face of a pipe 8 can come into contact. The inner peripheral surface of the flange section 16 can be designed as a polygon (not shown). In this way, additional protection against unwanted rotary movements of the force-transmitting element 2 relative to the fitting 6 can be obtained in the interaction with the outer peripheral surface of the base body 12, opposite the inner peripheral surface of the flange section 16, on which the force-transmitting element 2 is to be positioned.

The transmitting section 18 of the force transmitting element 2 has a wall thickness tapering at least in sections from the end close to the flange section 16 to the end remote from the flange section 16. This is to be understood such that although the tapering, i.e. the decrease in wall thickness, is modified by shaped elements, like a latching recess 26, which is annularly circumferential and in this example is arranged at the end of the transmitting section 18 close to the flange section 16, and like an annularly circumferential retaining recess 28, which in this example is arranged between the latching recess 26 and the end remote from the flange section 16, its tendency persists. The tapering or 30 decrease in wall thickness can thus be represented by an imaginary line (not shown) which runs though the sections of the transmitting section 18 lying the furthest way radially outwardly, for example in the fashion of an envelope. In this particular exemplary embodiment, the decrease in wall thickness occurs at least in sections through formation of a tapered segment area which is inclined at an angle of 5 approximately 15° against the center axis 30 of the force transmitting element 2. It is, however, also possible to choose an angle up to 75°.

On the outer peripheral surface of the transmitting section 18, in this example, three recesses 32 are arranged between the retaining recess 28 and the distal end to reduce the contact surface. The recesses 32 in this example assume the shape of annularly circumferential grooves but can, for example, also be formed as fluting.

In this example, two openings 34 are arranged in the area of the end close to the flange section 16 of the transmitting section 18 of the force transmitting element 2, which openings 34 have an extension running essentially in the peripheral direction. The openings 34 allow the installer to visually check the position of the workpieces 2, 4, 6, 8 before and, where applicable, after the pressing operation. The openings 34 can, of course, also have another form or can be located in another place. The number of openings 34 can also in principle be freely chosen.

As a protection against rotation, provision can be made for the inner peripheral surface of the transmitting section 18 to be formed as a polygon (not shown).

Furthermore, FIG. 1a shows a sleeve 4, the first end of which in cross-section, i.e. in cross-sectional view, has a certain thickness, and the second end of which compared to the first end in cross-section is tapered. The outer diameter of the sleeve 4 is constant at least in sections over the outer peripheral surface in the axial direction. This means, in particular, that shape features with small spatial dimensions can be provided which modify the uniformity of the outer diameter. In this particular example, a modification is made by the tapered end of the sleeve 4 being slightly angled radially outwardly. It is, however, also possible for the sleeve 4 to be formed with an outer diameter which is constant over the entire axial extension of the sleeve 4. In addition, a latching projecting part 36, extending radially inwardly is arranged on the inner peripheral surface of the tapered end. This projecting part 36, in this example, is annularly circumferential. The inner circumferential surface of the sleeve 4 has at least in sections a hollow conical segment shape. On the outer peripheral surface of the sleeve 4, on the untapered end, a chamfer 38 is arranged to which a pressing tool (not shown) can be attached.

The last workpiece in the assembly illustrated in FIG. 1a is, in this exemplary embodiment, a composite pipe 8 which comprises three layers 40, 42, 44. For example, the inner layer 40 can consist of a cross-linked polyethylene (PEX), the middle layer 42 can consist of a metal, such as aluminum, and the outer layer 44 can consist of a plastic material in particular capable of withstanding mechanical stresses or also satisfying aesthetic considerations. The composite pipe 8 shown in FIG. 1a is, however, only to be 30 understood as an example. Of course, the assembly shown in FIG. 1a could also comprise a single layer pipe, for example made of a plastic material. The cross-section of the pipe 8 is also not, in principle, restricted. What is crucial is that the relevant diameters of the workpieces 2, 4, 6, 8, i.e. the outer diameter of the support body 10 of the fitting 6 and the inner diameter of the pipe 8, and the outer 5 diameter of the pipe 8 and the inner diameter of the transmitting section 18 of the force-transmitting element 2 are suited to one another or adapted to one another.

Figure 1B:
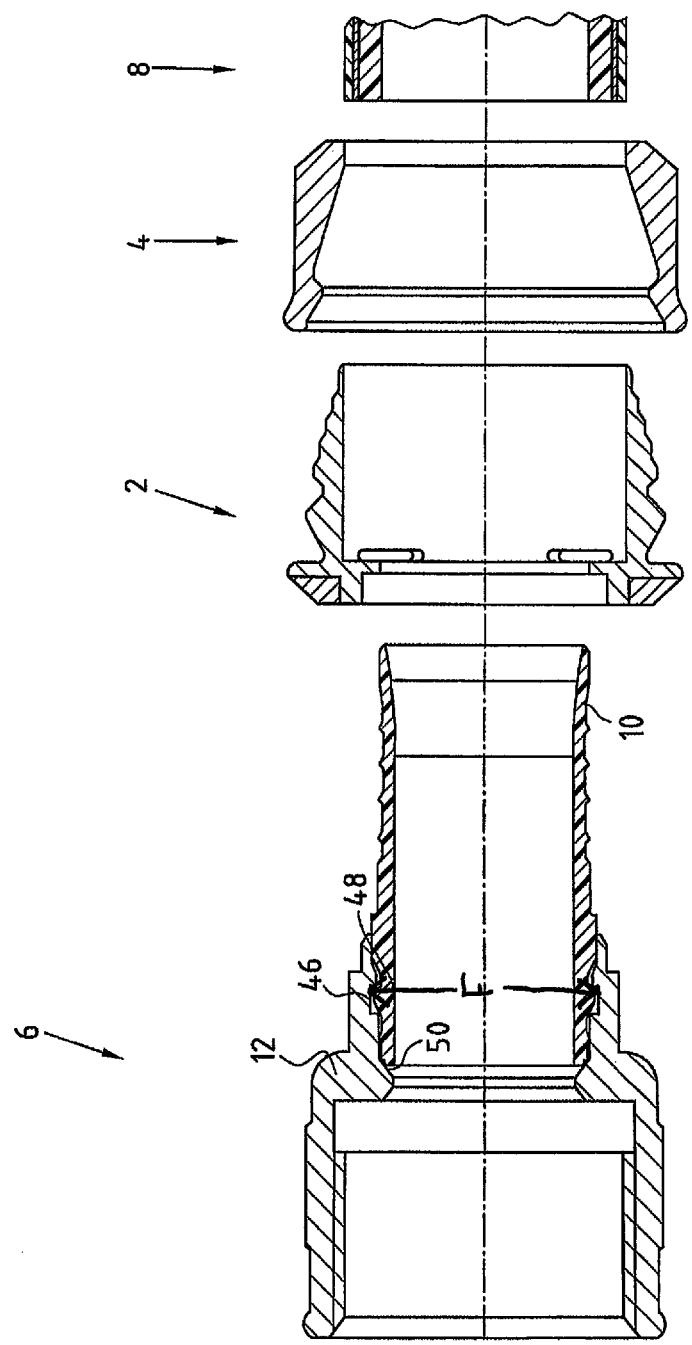
FIG. 1b shows the two-part fitting according to the present invention, the pipe, as well as the exemplary embodiments of the force-transmitting element and the sleeve in a cross-sectional view, in which the two-part fitting is assembled.

The assembly shown in FIG. 1b differs from the one illustrated in FIG. 1a, in that the support body 10 is inserted into the base body 12, so that the fitting 6 is now in one piece. The support body 10 is in the process firmly fixed in the base body 12 by means of a latching mechanism. Thus, the base body 12 has a circumferential recess 46 on the inside thereof and the support body 10 has a circumferential tooth 48 on the outside thereof. The tooth 48 is chamfered on the side close to the base body 12, in order to make insertion of the support body 10 into the base body 12 easier. The base body 12 also has a circumferential contact surface 50 on the inside thereof. In FIG. 1b, the support body 10 is inserted into the base body 12 in such a way that it is brought into contact with the contact surface 50 of the base body 12. With this arrangement, the circumferential tooth 48 of the support body 10 is locked into the circumferential recess 46 of the base body 12, so that the support body 10 is firmly and securely connected to the base body 12.

Figure 9:
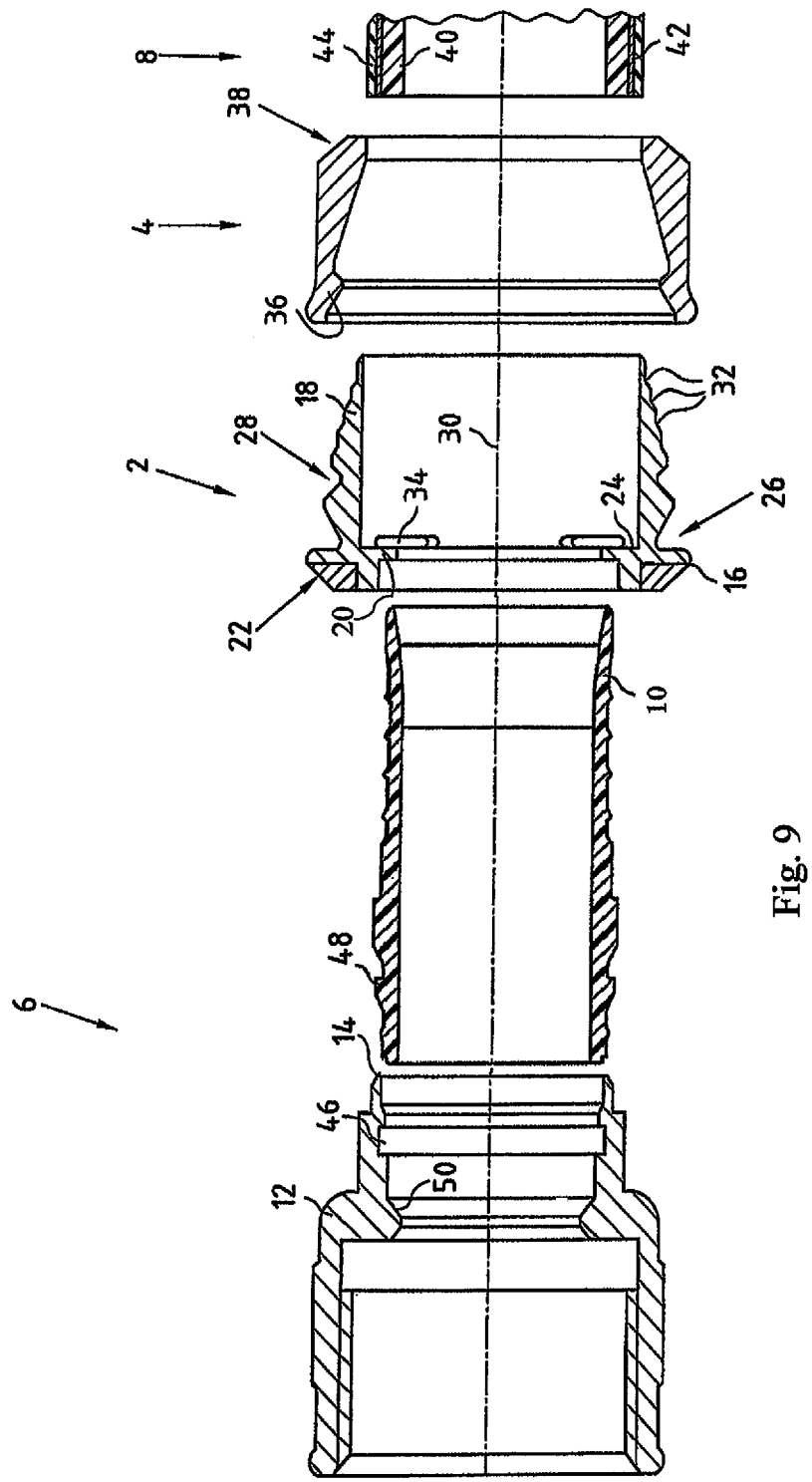
FIG. 9 shows a first exemplary embodiment of a two-part fitting according to the present invention, a pipe, as well as exemplary embodiments of a force-transmitting element and a sleeve in a cross-sectional view, as well as a support body that has an "original size" that differs from its size after being connected to a base body.

In FIG. 9, the support body 10 can optionally be pressed oversized into the base body 12, so that a strong force-fit connection F, as shown in FIG. 1 b, exists on the radial contact surface between the support body 10 and the base body 12. FIG. 1b shows the support body 10 actually pressed into the base body 12.

Figure 2:
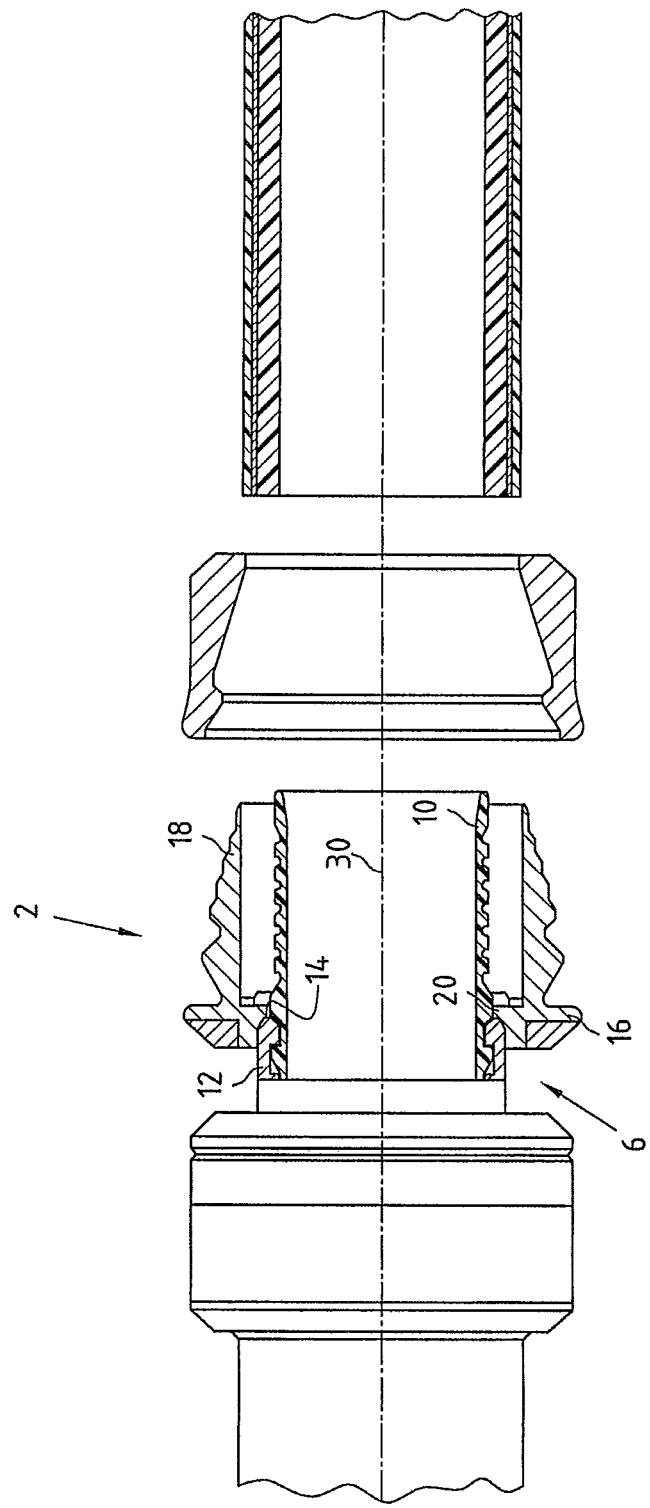
FIG. 2 shows the two-part fitting according to the present invention, the pipe, as well as the exemplary embodiments of the force-transmitting element and the sleeve in a cross-sectional view, in which the force-transmitting element is positioned on the fitting.

The assembly shown in FIG. 2 differs from the one illustrated in FIG. 1b, in that the force-transmitting element 2 is attached to the fitting 6 or the fitting 6 engages with the force-transmitting element 2. In this example, the flange section 16 is fixed to the fitting base body 12 by means of a press-fit, i.e. a frictional contact, and as a result inhibits an axial movement of the force-transmitting element 2 and the fitting 6 towards one another. The abutting face 14 of the fitting 6 turned in the axial direction is, in this example, in contact with the contact element 20 arranged on the flange section 16. In the exemplary embodiment shown in FIG. 2, the fitting base body 12 is essentially encompassed by the flange section 16 and the support body 10 is essentially encompassed by the transmitting section 18, wherein the distal end of the support body 10 on the transmitting section side protrudes from the power-transmitting element 2. This configuration is not, however, mandatory. It is also conceivable for the distal end of the 20 support body 10 and the distal end of the transmitting section 18 to lie in the same perpendicular plane to the center axis 30 or for the distal end of the transmitting section 18 to even stick out from the support body 10. Various configurations can, therefore, be chosen.

Figure 3:
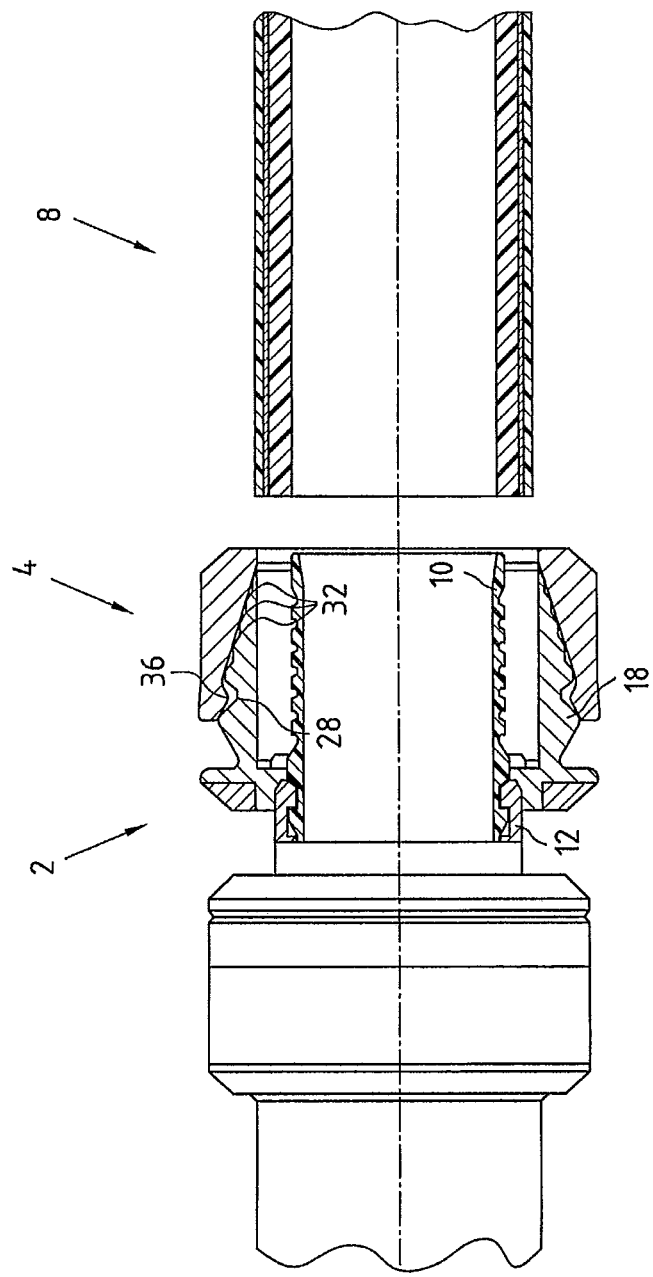
FIG. 3 shows a system according to the present invention with the pipe in a cross-sectional view, in which the sleeve is positioned in an intermediate position on the force-transmitting element.

The arrangement according to the invention shown in FIG. 3 differs from the one illustrated in FIG. 2, in that the sleeve 4 on the transmitting section side is fixed to the force-transmitting element 2. The latching projecting part 36, arranged on the tapered end of the sleeve 4, engages with the retaining recess 28, arranged on the outer circumferential surface of the transmitting section 18, so that in an intermediate position—before the actual pressing operations are initiated—a downwards movement of the sleeve 4 from the force-transmitting element 2 is prevented. The other sections of the inner peripheral surface of the sleeve 4 and the section of the transmitting section located between the retaining recess 28 and the distal end are preferably adapted to one another and are at least in sections—apart from the recesses 32 for reducing the contact surface—in frictional contact.

Thus, on the left side of FIG. 3 in cross-section, a system according to the invention for producing a non-detachable workpiece connection is illustrated, which an installer can purchase commercially and which only has to be completed by a pipe 8 to be pressed in order to carry out the pressing.

Figure 4:
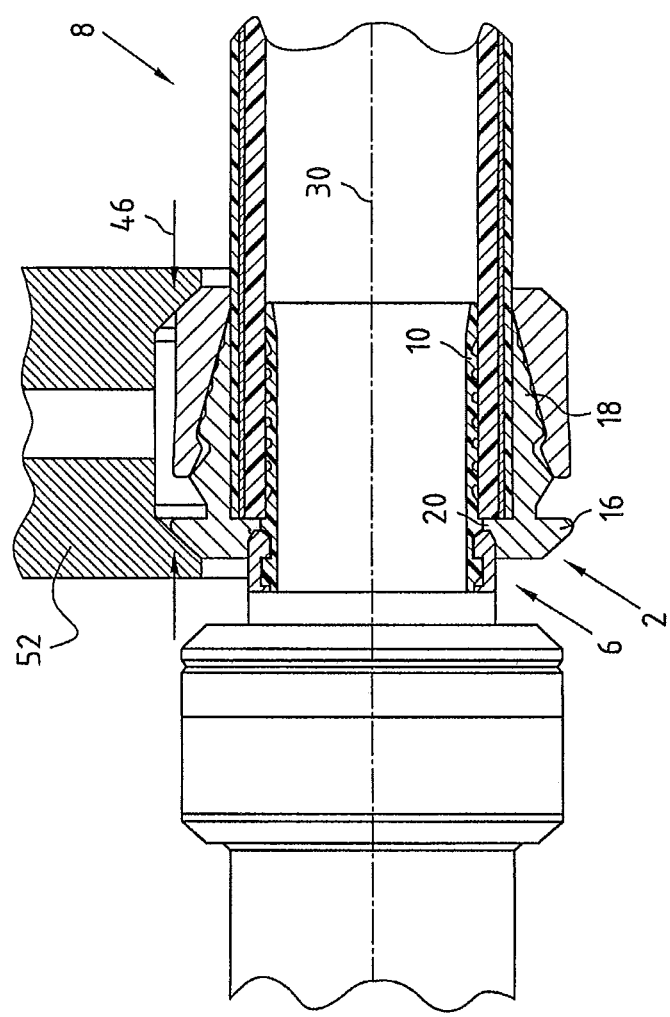
FIG. 4 shows the fitting according to the present invention, the pipe, as well as the exemplary embodiments of the force-transmitting element and the sleeve in a cross-sectional view, in which the pipe is inserted between the fitting and the force-transmitting element, and in which firstly axial pressing is carried out.

FIG. 4 shows the assembly known from FIGS. 1a to 3, in which the pipe 8 is inserted into the cavity between the support body 10 of the fitting 6 and the transmitting section 18 of 20 the force-transmitting element 2. The front face of the pipe 8 is pushed all the way onto the flange section 16 and the contact element 20 arranged on the flange section 16. The installer in the assembly shown in FIG. 4 can check the positions of the workpieces 2, 4, 6, 8 in relation to one another by means of the openings 34 (not shown) arranged on the transmitting section 18. In order to initiate establishing of a non-detachable workpiece connection, the axial pressing forces can now be exerted on the by the arrows 46 illustrated in FIG. 4 and running parallel to the center axis 30, for example by using a pressing tool 52 (here only illustrated from one side).

The result of the axial pressing operation is shown in FIG. 5. By exerting pressing forces, the sleeve 4 is moved via the transmitting section 18 in the axial direction towards the flange section 16. By inclining the section of the inner peripheral surface of the sleeve 4 and the corresponding sections of the outer peripheral surface of the transmitting surface 18, the dynamics of the pressing movement, exerted in the axial direction in this particular exemplary embodiment, are diverted at least partly into radially inwardly acting pressing forces. The transmitting section 18 transmits the pressing forces to the pipe 8 which is formed radially inwardly in such a way that the grooves separated by the separating strips on the support body 10 of the fitting 6 accommodate the displaced material of the pipe 8 and hence a force-fit and form-fit connection can be formed, which ensures the leak-tightness of the non-detachable workpiece connection. In the provisional end position after the axial pressing operation, the latching projecting part 36 of the sleeve 4 lies opposite the latching recess 26 of the transmitting section 18, wherein, however, a section of the latching projecting part 36 can be in contact with a wall of the latching recess 26 in such a way that axial movement of the sleeve 4 downwards from the force-transmitting element 2 after the axial pressing operation can be inhibited.

As is shown in the enlargement in FIG. 5b, the tapered end of the sleeve 4, after the axial pressing operation, projects slightly radially outwardly beyond the plane defined by the outer peripheral surface of the flange section 16 and thus provides the pressing tool 52 with a favourable starting point for a radially inward pressing movement (arrow 54). Thus, a radially inward pressing operation follows the axial pressing operation, whereby a section of the sleeve 4, in this example the tapered end of the sleeve 4, on the inner peripheral surface of which the latching projecting part 36 is arranged, is moulded into the latching recess 26 and consequently causes the sleeve 4 to be stably locked to the force-transmitting element 2. The situation can thereby be counteracted, in which the sleeve 4 detaches itself again from the force-transmitting element 2, for example due to material expansions or contractions triggered by changes in temperature, which could result in leakages.

FIG. 6a once again shows the four workpieces 2, 4, 6, 8, after both the axial and the radially inward pressing operations have been completed and the non-detachable workpiece connection has been thereby established. As can be seen in the enlargement in FIG. 6b, the angled end of the sleeve 4 is formed into a largely flush alignment with the outer peripheral surface of the flange section 16 during the radially inward pressing operation. In this way, the non-detachable workpiece connection can be formed very compactly.

FIG. 7 shows a second exemplary embodiment of a system according to the invention with a second exemplary embodiment of a fitting according to the invention. The fitting 61 is formed in two parts, having a base body 80 made of metal and a cylindrical support body 82 made of a plastic material. The base body 80 has means 84 on the inside thereof which are suitable for connecting the support body 82 to the base body 80 in a sealing and durable manner. The support body 82 has corresponding means 86 on the outside thereof. The means 84, 86 can, for example, be designed as threads, latching mechanisms or as adhesive surfaces. A sleeve 63, manufactured from metal, is fixed to the fitting 61 in the axial direction via a retaining ring 64. The retaining ring 64 is manufactured from plastic and snapped into a latching groove 65 of the fitting 61. Furthermore, the retaining ring 64 is itself provided with a latching groove 66, into which a ring section 67, flared on a face end of the sleeve 63, is snapped. The sleeve 63 projects beyond the free end 68, lying in the connection area, of the fitting 61 and is also provided with a flared ring section 67 in this area and, in 10 this respect, is symmetrically formed.

The retaining ring 64 is equipped with a ring flange 69. A plastic pipe is identified with the reference symbol 70, which is to be connected to the fitting 61. A plurality of circumferential grooves 72 and 73 are provided on the support body 62, wherein the grooves provided with the reference symbol 72 are serrated and the grooves provided with the reference symbol 73 have a rounded cross-sectional shape. Considerable tensile forces can be absorbed via the serrated grooves, while the rounded grooves 73 produce a flawless sealing between the plastic pipe 70 and the fitting 61. The retaining ring 64, manufactured from plastic, is provided in its circumferential area with at least one radially running aperture 74 which is provided in the area in which the plastic pipe 70 abuts on the fitting 61. By means of this aperture, a plurality of which can also be provided on the periphery of the retaining ring 64, the exact position of the plastic pipe can be easily checked before establishing the pressing connection. The said parts are illustrated before assembly.

Figure 8:
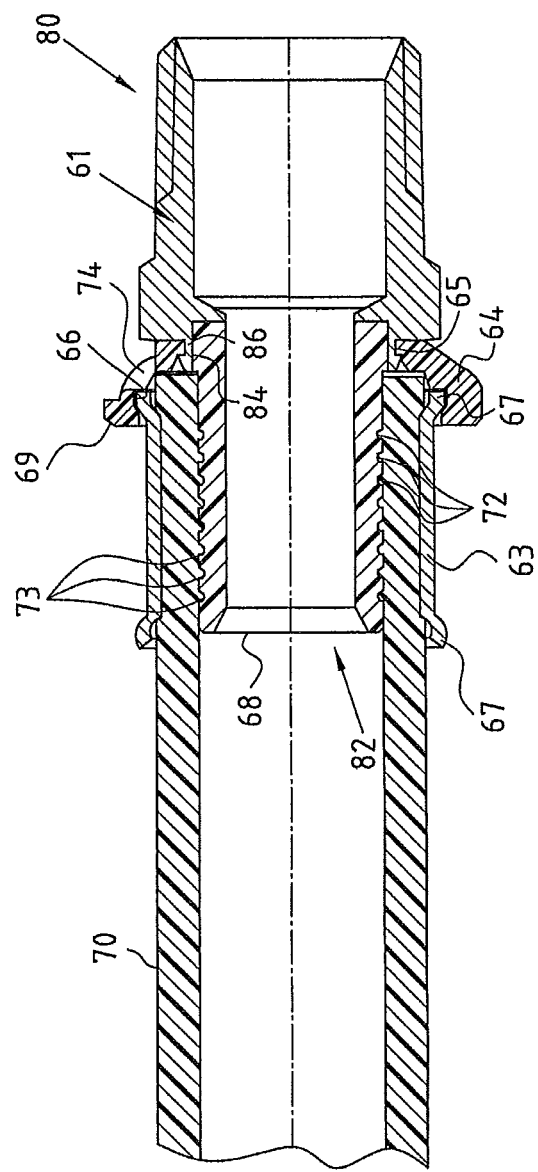
FIG. 8 shows the second exemplary embodiment of the two-part fitting according to the invention in cross-section with the sleeve after inserting the composite pipe and after pressing the sleeve together with the composite pipe and the fitting.

FIG. 8 shows the system from FIG. 7 after inserting a multilayer or composite pipe 70 into the area between the support body 82 and the sleeve 63. The sleeve 63 is pressed onto the multilayer or composite pipe 70 to establish the connection by means of a pressing tool 90, shown in outline by dotdashed lines in FIG. 7 and which, on the one hand, is guided on the ring flange 69 of the retaining ring 64 and, on the other hand, is guided on the ring section 67 provided in the free end area of the sleeve 63.

The pipe 70 shown in FIG. 7 and FIG. 8 can also alternatively be a plastic pipe, wherein the plastic pipe 70 can then be optionally firmly bonded to the support body 82 in FIG. 8.

The invention claimed is:

1. A system, comprising:
a fitting for connecting in a sealing manner to an end of a pipe comprising a plastic material, comprising:
    a base body comprising an interior surface defining an interior cavity, and
    a support body comprising an exterior surface onto which a pipe can be fitted,
    wherein the base body consists of a metal, and
    the support body is formed as a part which is separate from the base body and is made of a plastic material, and
    wherein the base body on the interior surface thereof and the support body on the exterior surface thereof have a mechanism for directly and sealingly connecting the base body and the support body when the support body is inserted into the interior cavity of the base body,
    and wherein the exterior surface of the support body exerts a force on the interior surface of the base body in the area of the connection to the support body owing to the plastic material of the support body attempting to expand to its original size;
a composite or a multilayer pipe; and
a sleeve;
wherein the fitting is connected to the composite or the multilayer pipe and the sleeve is pressed together with the fitting and the composite or the multilayer pipe.

2. A system, comprising:
a fitting for connecting in a sealing manner to an end of a pipe comprising a plastic material, comprising:
    a base body comprising an interior surface defining an interior cavity, and
    a support body comprising an exterior surface onto which a pipe can be fitted,
    wherein the base body consists of a metal, and
    the support body is formed as a part which is separate from the base body and is made of a plastic material, and
    wherein the base body on the interior surface thereof and the support body on the exterior surface thereof have a mechanism for directly and sealingly connecting the base body and the support body when the support body is inserted into the interior cavity of the base body,
    and wherein the exterior surface of the support body exerts a force on the interior surface of the base body in the area of the connection to the support body owing to the plastic material of the support body attempting to expand to its original size;
a plastic pipe; and
a sleeve;
wherein the plastic pipe is firmly bonded to the support body of the fitting and
wherein the sleeve is pressed together with the fitting and the plastic pipe.

\* \* \* \* \*

UNITED STATES PATENT AND TRADEMARK OFFICE
CERTIFICATE OF CORRECTION

| | | |
|---|---|---|
| PATENT NO. | : 9,004,541 B2 | Page 1 of 1 |
| APPLICATION NO. | : 13/063880 | |
| DATED | : April 14, 2015 | |
| INVENTOR(S) | : Sudi Sinoplu et al. | |

It is certified that error appears in the above-identified patent and that said Letters Patent is hereby corrected as shown below:

On the title page, Column 1, Item (87) PCT Pub. No., delete "WO2010/031750" and insert
-- WO2010/031760 --

Signed and Sealed this
Seventeenth Day of November, 2015

Michelle K. Lee
*Director of the United States Patent and Trademark Office*